United States Patent [19]

Elwood

[11] 3,916,410
[45] Oct. 28, 1975

[54] METHOD OF AND SYSTEM FOR LOCATING A POSITION

[76] Inventor: Albert A. Elwood, c/o Ocean Measurements, Inc., 4390 Westroads Drive, West Palm Beach, Fla. 33407

[22] Filed: Mar. 8, 1974

[21] Appl. No.: 449,452

Related U.S. Application Data

[63] Continuation-in-part of Ser. Nos. 186,206, Oct. 4, 1971, Pat. No. 3,797,015, Ser. No. 186,136, Oct. 4, 1971, Pat. No. 3,839,719, and Ser. No. 186,112, Oct. 4, 1971, Pat. No. 3,816,832, each is a continuation-in-part of Ser. No. 833,638, June 16, 1969, Pat. No. 3,613,095.

[52] U.S. Cl. ..................... 343/112 D; 235/150.27
[51] Int. Cl.² .......................................... G01S 3/02
[58] Field of Search ............ 343/112 D, 112 C, 102; 235/150.27

[56] References Cited
UNITED STATES PATENTS

| | | | |
|---|---|---|---|
| 3,325,811 | 6/1967 | Earp | 343/112 D |
| 3,397,400 | 8/1968 | Maass et al. | 343/112 D |
| 3,613,095 | 10/1971 | Elwood | 343/112 D |
| 3,816,832 | 6/1974 | Elwood | 343/112 D |

*Primary Examiner*—Maynard R. Wilbur
*Assistant Examiner*—T. M. Blum
*Attorney, Agent, or Firm*—Baldwin, Wight & Brown

[57] ABSTRACT

A method of and system for locating a position in which a plurality of frequency standard devices (atomic clocks) are synchronized or phase compared at the same initial location. Two of three frequency standard devices are placed at transmitting stations on a known baseline. The third device is at a third station which receives signals from the two transmitting stations. The radio frequency carrier signal produced at each transmitting station is modulated with a single, low frequency signal produced under the control of the same frequency standard device which controls the means which produce the radio frequency carrier. At the receiving station, means are provided for producing a reference signal, corresponding, in frequency, to the low frequency modulating signal and two local radio frequency signals corresponding, in frequency, to the radio frequency carrier signals transmitted. The phase of the reference signal is compared, at the receiving station, with the phase of the modulating signals recovered from the radio frequency carriers to determine respective phase differences, the differences representing coarse position data from which the total number of phase rotations (full lanes) the receiving station is from each of the transmitting stations are determined. The phase relationships between each of the received radio frequency carrier signals and the respective one of the two radio frequency signals produced at the receiving station are determined, the relationships representing fine position data which are measurements of the receiving station position within a given phase rotation (lane).

50 Claims, 11 Drawing Figures

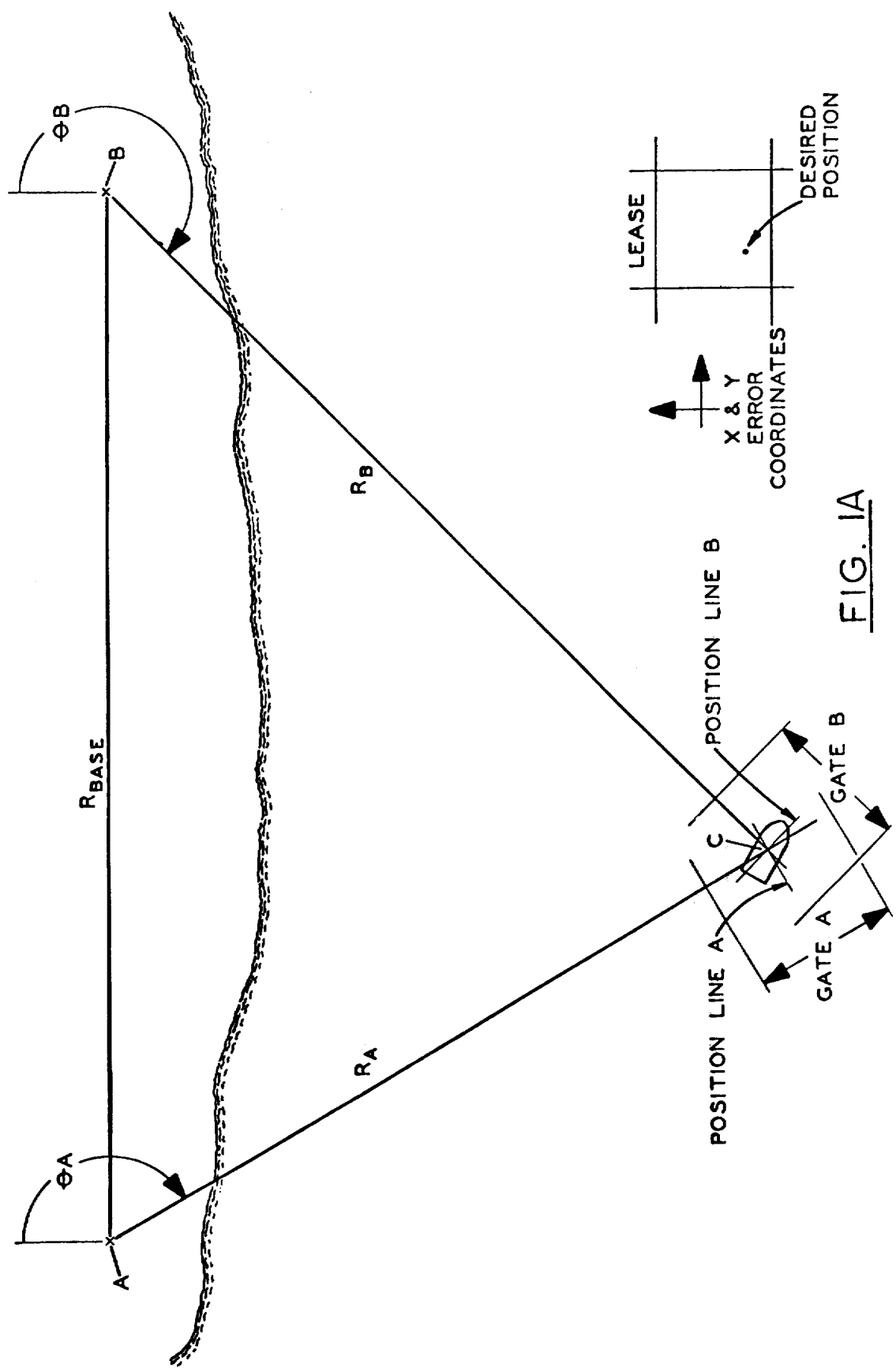

3,916,410

METHOD OF AND SYSTEM FOR LOCATING A POSITION

This application is a continuation-in-part of each of my co-pending applications Ser. No. 186,206 filed Oct. 4, 1971, for "Method of and System for Locating a Position," now U.S. Pat. No. 3,797,015, issued Mar. 12, 1974, Ser. No. 186,136 filed Oct. 4, 1971, for "Radio Transmitting Station," now U.S. Pat. No. 3,839,719, issued Oct. 1, 1974, and Ser. No. 186,112 filed Oct. 4, 1971 for "Radio Receiving Station" now U.S. Pat. No. 3,816,832, issued June 11, 1974. Each of said prior applications filed Oct. 4, 1971 is a continuation-in-part of my application Ser. No. 833,638 filed June 16, 1969, for "Method of and Apparatus for Locating a Position," now U.S. Pat. No. 3,613,095 issued Oct. 12, 1971.

BACKGROUND OF THE INVENTION

1. Field of the Invention

This invention relates in general to position locating and in more particularity to a method and system for accurately locating a specific position.

Although both the method and the system are of general utility they are especially useful in offshore oil surveys where it is important that a specific location be accurately and precisely identified. In an operation such as an offshore oil survey two transmitting stations would be land-based whereas a receiving station would be located on an offshore vessel which can be moved to an exact location which is being sought.

2. Description of the Prior Art

Many phase or time comparison systems have been developed for locating a position and are in use today. There are those based on the radar principle in which an echo or return of signal technique is used; there are those based on the use of transponders where receipt and retransmission of a signal are utilized; and there are those based on the Loran principle where time difference in the receipt of two transmitted pulses define a hyperbolic line of position.

A method of and a system for locating a position are disclosed in the United States patent to Elwood U.S. Pat. No. 3,613,095. A plurality of frequency standards (atomic clocks) are synchronized or phase compared at the same location. Two of the frequency standards are respectively placed at radio transmitting stations located on a known baseline, a third one of the frequency standards being positioned at a receiving station. The transmitting stations broadcast respective intermittently pulse amplitude modulated radio frequency signals of different frequencies. The phase of the radio signals, the frequencies of the radio signals and the particular points in time during which modulation is applied are all determined under the control of the respective frequency standards at the transmitting stations.

The frequency standard (atomic clock) at the receiving station, which has an unknown position, is used to effect control of the phase and frequencies of respective first and second locally produced radio frequency signals and of a locally produced timing pulse signal. The frequencies of the two locally produced radio frequency signals correspond respectively to the frequencies of the signals received from the transmitting stations. The receiving station is provided with means to demodulate the signals received from the two transmitting stations so as to recover the intermittent pulses. Pulse time comparators are used to compare the relative positions of the locally produced timing pulses with those pulses recovered from the received radio frequency signals as measures of the respective coarse ranges (lane identifications) the receiving station is from the two transmitting stations. The phases of the received radio frequency signals are compared respectively to the phases of the locally produced radio frequency signals of corresponding frequency as measures of fine range (position within a lane) the receiving station is from the two transmitting stations.

A computer is used to calculate the actual range the receiving station is from each of the two transmitting stations, thus its position is determined in two dimensions.

The method and apparatus disclosed in the U.S. Pat. No. 3,613,095 have a number of drawbacks. Firstly, an excessive transmission bandwidth is required due to the fact that the carriers are required to be intermittently amplitude modulated with pulses which must have steep leading and/or trailing edges. Secondly, the need to modulate intermittently at precise points in time is very difficult to achieve and requires considerable expense.

SUMMARY OF THE INVENTION

Due to the high stability of atomic clocks, which are accurate on the order of 1 part in $10^{12}$ or $10^{13}$, no continuous synchronization between stations is required once the initial synchronization among three atomic clocks is performed or the initial phase/time relationships among the three atomic clocks are established.

The frequency of an atomic clock is determined by atomic particle or molecular vibrations and thereby remains constant. Its accuracy is about one hundred to one thousand times as great as that of the quartz clock in which the vibration frequency changes in the course of time. Due to the constancy of the frequency of an atomic clock a new and novel system of position locating has been discovered.

Coarse range is defined as the total number of phase rotations at the carrier or r.f. frequency (wavelengths) over the distance between each transmitting station and the receiving station, measured to the nearest full phase rotation in a direction along the transmitting station radials toward each transmitting station. Full phase rotations (wavelengths) or even fractions thereof may be further defined as lanes.

Fine range is defined as the position of the receiving station within a given phase rotation, or lane, measured in a direction along the transmitting station radials toward each transmitting station.

Coarse and fine ranges are combined in a computer to determine the distance in lanes and fractions of a lane to each transmitting station from the receiving station. Because of this, the system may be defined as a range-range system. The computer may be an appropriately programmed sophisticated computer used to convert the ranges into position with respect to any grid or geographic reference that may be desired.

It is the principal object of the invention to provide a method of and a system for locating a position in which frequency standard devices are used and only very small transmission bandwidths are required.

It is a further object of the invention to provide a method of and a system for locating a position in which frequency standard devices are used and no need to modulate intermittently at precise points in time exists.

It is another object of the invention to provide a method of and a system for locating a position in which frequency standard devices are used and modulation is effected continuously.

It is an additional object of the invention to provide a transmitting station particularly useful in conjunction with a method of and a system for locating a position in which very small transmission bandwidths are required, no need to modulate intermittently exists and modulation is effected continuously.

It is a still further object of the invention to provide a receiving station particularly useful in conjunction with a method for locating a position in which very small transmission bandwidths are required, no need to demodulate intermittently modulated signals exists and demodulation of continuously modulated signals is accomplished by conventional demodulators.

It is still another object of the present invention to provide a method of and a system for locating a position in which frequency standard devices are use in conjunction with single side band techniques.

It is still an additional object of the present invention to provide a method of and a system for locating a position in which frequency standard devices are used in conjunction with double side band suppressed carrier techniques.

It is yet a further object of the present invention to provide a transmitting station, particularly useful in conjunction with a method of and a system for locating a position, in which a frequency standard device controls the production of a single side tone radio frequency signal.

It is yet another object of the present invention to provide a transmitting station, particularly useful in conjunction with a method of and a system for locating a position, in which a frequency standard device controls the production of a suppressed carrier double side tone radio frequency signal.

It is yet an additional object of the present invention to provide a receiving station, particularly useful in conjunction with a method of and a system for locating a position which includes a frequency standard device and is responsive to a single side tone radio frequency signal.

It is another object of the present invention to provide a receiving station, particularly useful in conjunction with a method of and a system for locating a position, which includes a frequency standard device and is responsive to a carrier suppressed double side tone radio frequency signal.

It is still another object of the invention to provide a method of and a system for locating a position in which frequency standard devices are used and phase comparison techniques are used to provide both coarse and fine position data, which represent respectively coarse and fine ranges.

It is still an additional object of the invention to provide a method of and a system for locating a position in which frequency standard devices at transmitter locations are used to produce radio frequency carrier waves which are phase compared with signals produced at a receiving station, under the control of a frequency standard device, to provide fine position data, and single frequency modulation signals, under the control of the frequency standard devices at the transmitter locations, are placed on the radio frequency carriers, recovered at the receiving station and phase compared with a corresponding signal produced at the receiving station, under the control of the frequency standard device at the receiving station, to provide coarse position data.

It is another object of the invention to provide a position locating system in which atomic clocks or the like are utilized to provide a plurality of signals having known phase relationships with one another and a plurality of single tone modulating signals, and local single tone reference signal having known phase relationships with one another to develop respectively fine and coarse position information.

It is still a further object of the invention to provide a method of and a system for locating a position in three dimensions using three transmitting stations, controlled by frequency standard devices, and a receiving station which also uses a frequency standard device to provide signals for comparison with signals received from the transmitting stations.

It is still another object of the invention to provide a method of and a system for locating a position in three dimensions using three transmitting stations, controlled by frequency standard devices, and a receiving station which also uses a frequency standard device to provide signals for comparison with signals received from the transmitting stations, at least one of the transmitting stations being carried by a satellite.

In its method and system aspects, the invention involves generating at each of a plurality of transmitting stations respective radio frequency signals modulated by respective low, single frequency signals. The low frequency signal and the radio frequency signal, in each case, are produced under the control of a frequency standard device, an atomic clock. At the receiving station, a low frequency signal, corresponding to the modulation low frequency signal and signals, corresponding to the radio frequency signals produced at each transmitting station, are produced under the control of a frequency standard device, an atomic clock. The modulation signal is recovered from each received radio frequency signal and phase compared with the low frequency signal produced at the receiving station to produce coarse range data. The phase of each of the received radio frequency signals, or either their upper or lower side tone, or I.F. signals derived therefrom are phase compared with the corresponding radio frequency signals produced at the receiver to produce fine range data.

In its transmitting station aspect, the invention involves modulating a radio frequency carrier with a low single frequency modulating signal. The modulator used may be a phase modulator, a frequency modulator or an amplitude modulator. The modulator is most preferably a balanced modulator which produces a carrier suppressed double side tone signal. The modulator preferably is a modulator which produces a single side tone signal.

In its receiving station aspect, the present invention involves phase comparison circuit means which compares the phase of recovered modulation signals, which in the case of reception of suppressed carrier wave signals is a signal having twice the frequency of the actual modulating signal, with a locally produced corresponding low frequency signal to produce coarse range data. The phase of each of the received radio frequency signals, or either their upper or lower side tones, or I.F.

signals derived therefrom are phase compared with corresponding radio frequency signals locally generated to produce fine range data.

Further features, objects, and advantages will either be specifically pointed out or become apparent when, for a better understanding of the invention, reference is made to the following written description taken in conjunction with the accompanying drawings.

BRIEF DESCRIPTION OF THE DRAWINGS

FIG. 1A is a diagrammatic view illustrating the use of a method and system, in a two-dimensional arrangement, according to the invention;

FIG. 1C is a diagrammatic pictorial view illustrating the use of a method and system, in a three-dimensional arrangement, according to the present invention in which two transmitting stations are used in conjunction with an altimeter which can be carried on an aircraft or the like;

DESCRIPTION OF PREFERRED EMBODIMENTS

Referring now to FIG. 1A of the drawings, a system according to the invention will include a transmitting station A which is placed at a known position, a transmitting station B which is placed at a known position, with A and B placed on a known baseline $R_{base}$, and a receiving station C which is at an unknown position and becomes the measured or located position.

Figure 1B:
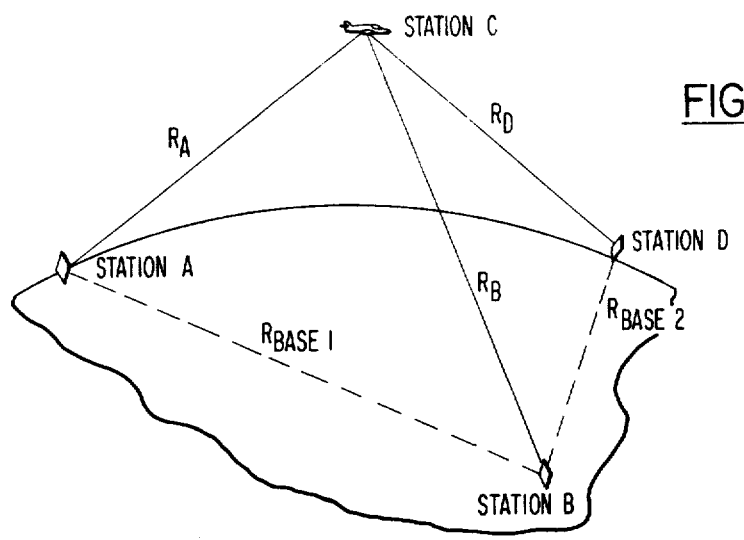
FIG. 1B is a diagrammatic pictorial view illustrating the use of a method and system, in a three-dimensional arrangement, according to the invention in which three transmitting stations are used.

As illustrated in FIG. 1B, a three-dimensional system according to the invention may include a transmitting station A, a transmitting station B and a transmitting station D each placed at a respective location, spaced from one another. Stations A and B are placed on a known baseline $R_{base\ 1}$ and stations B and D are placed on a known baseline $R_{base\ 2}$. A receiving station C, illustrated as being carried by a moving aircraft, is at an unknown position and becomes the measured or located position.

Figure 1C:
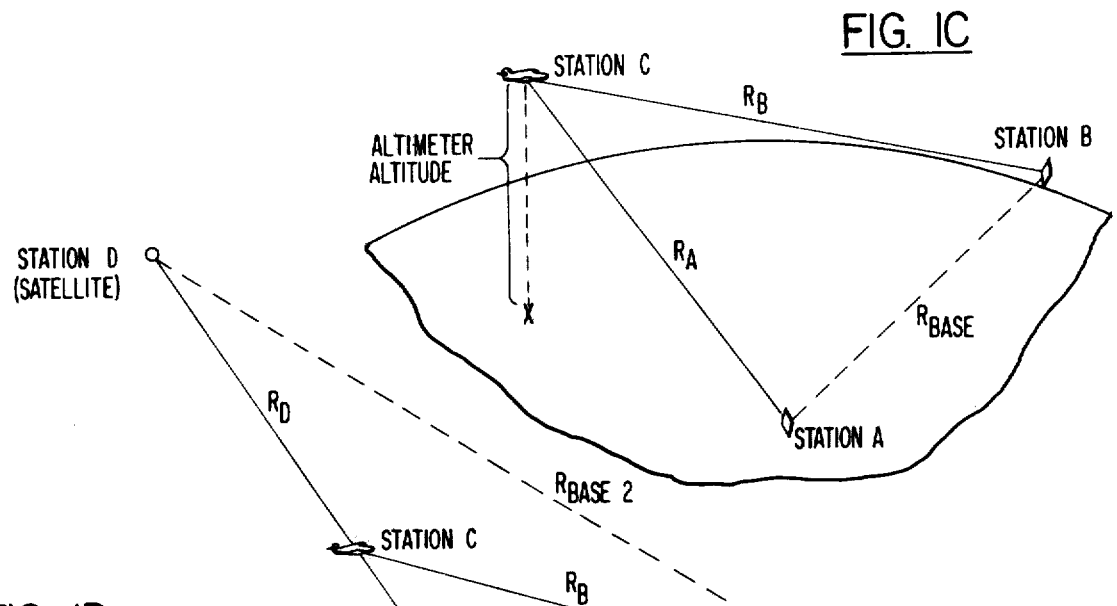

As shown in FIG. 1C, a three-dimensional system according to the invention may comprise a transmitting station A which is placed at a known position, a transmitting station B which is placed at a known position, stations A and B being positioned on a known baseline $R_{base}$, and a receiving station C shown as being carried by a moving aircraft which is at an unknown position. The aircraft carries as part of its equipment an altimeter.

Figure 1D:
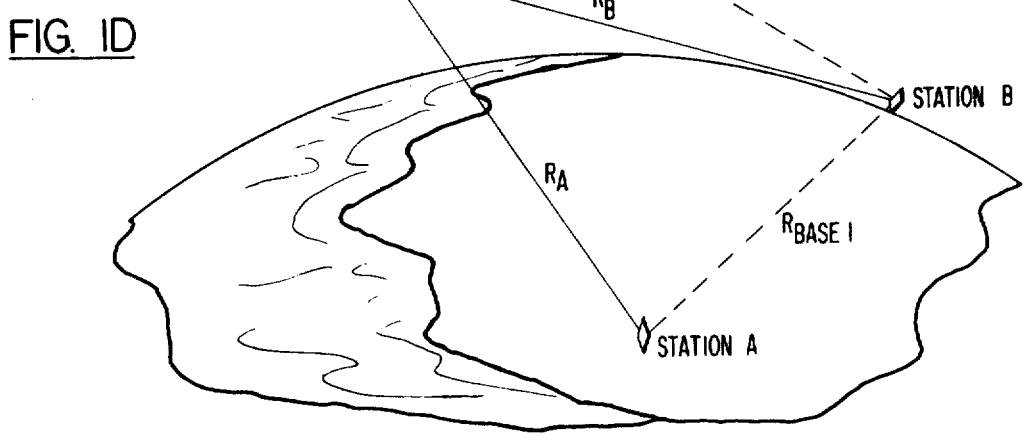
FIG. 1D is a diagrammatic pictorial view illustrating the use of a method and system, in a three-dimensional arrangement, according to the present invention in which three transmitting stations are used, one of them being carried by a satellite.

As illustrated in FIG. 1D, a further three-dimensional system according to the invention may include a transmitting station A, a transmitting station B and a transmitting station D each positioned at respective locations, spaced apart from one another. Stations A and B are placed on a known fixed baseline $R_{base\ 1}$ and stations B and D are placed on a known baseline $R_{base\ 2}$. As illustrated, station D is carried by a satellite which may be either a synchronized satellite or an unsynchronized satellite having a predictable orbit and known position at a given time. A receiving station C, illustrated as being carried by a moving aircraft, is at an unknown position and becomes the measured or located position.

The two transmitting stations illustrated here as shorebased stations A and B (FIGS. 1A and 1C) and transmitting stations A, B and D (FIGS. 1B and 1D) may be constructed as illustrated in greater detail in any one of FIGS. 2-5. The station is duplicated at A and B or A, B and D with the only essential difference being that different RF frequencies are transmitted from respective stations.

Figure 2:
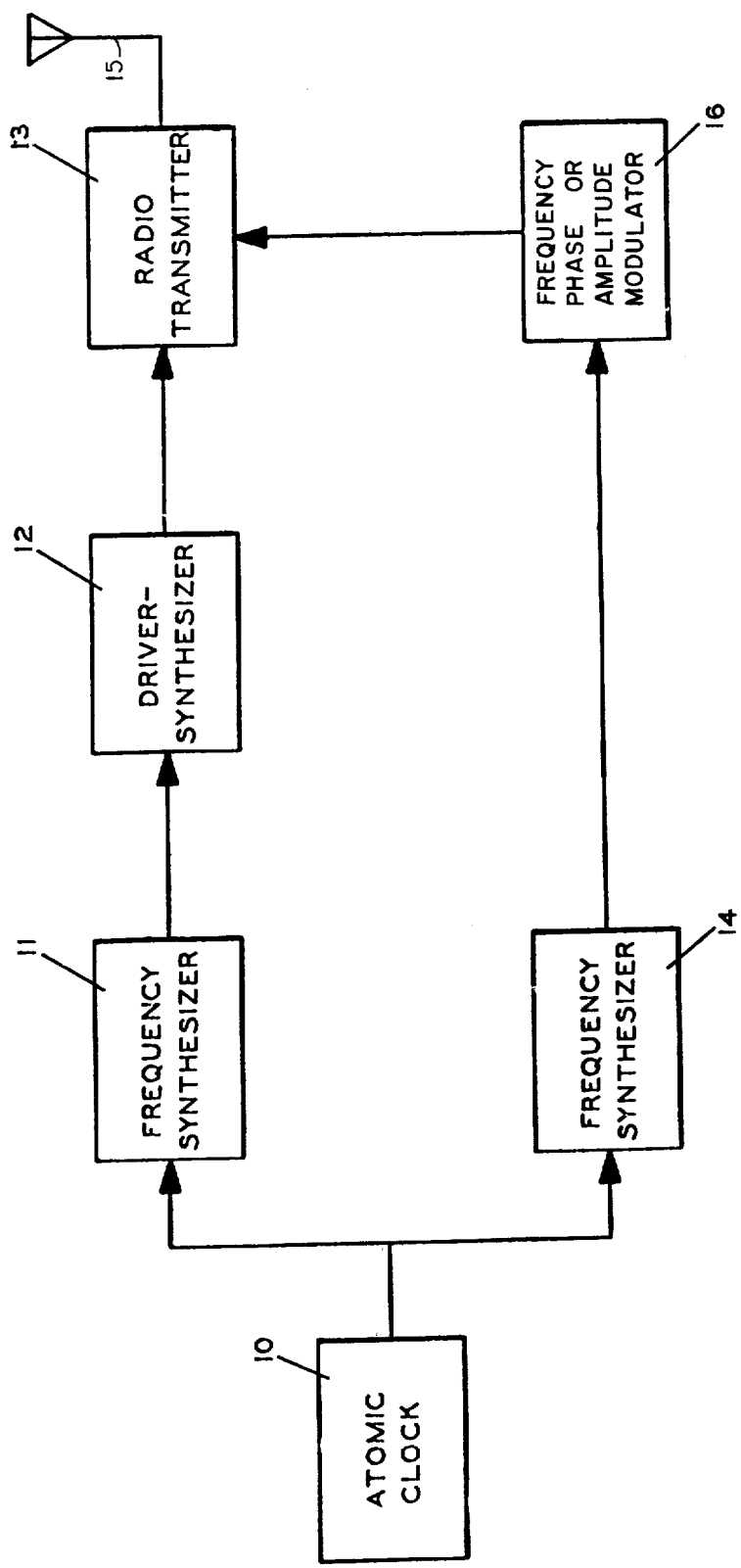
FIG. 2 is a block diagram of an illustrative embodiment of a transmitting station according to the invention.

Referring to FIG. 2, the transmitter includes an atomic clock 10 which provides a high frequency signal, for example 9 $GH_z$, which is utilized in two ways. The high frequency signal is fed to frequency synthesizer 11 where it is reduced in frequency to a selected frequency in a range suitable for transmission over distances of up to about 100 miles, in an exemplary system, and for accuracy of phase determination. The range may be, for example, from about 1.0 to about 5.0 $MH_z$. The frequency synthesizer 11 converts the high frequency signal, from clock 10 to one in the lower range (1.0 – 5.0 $MH_z$) while maintaining the stability of the primary standard from clock 10. The output of frequency synthesizer 11 which is extremely accurate in its phase and frequency characteristics is fed to a driver synthesizer 12 wherein it is amplified to a level sufficient to drive highly stable radio transmitter 13. The radio transmitter 13 is provided with an antenna 15 from which a radio frequency signal of given frequency is transmitted. Thus, the stability and accuracy of clock 10 is preserved and reflected in the radiated signal.

The high frequency signal from clock 10 is also fed to a frequency synthesizer 14 wherein it is converted into a given low frequency signal, which is useful as a single frequency modulating signal. The modulating signal may have a frequency of, for example, 500 $H_z$. The synthesizer 14, like the synthesizer 11, preserves the accuracy and stability of the clock 10 and reflects the accuracy thereof in its own output which is coupled to a modulator 16 which may be either a frequency modulator, a phase modulator or an amplitude modulator.

The modulations appearing on carrier signals from transmitting stations A, B and D (FIGS. 1B and 1D) or A and B (FIGS. 1A and 1C) are utilized at a moving receiving station C (FIGS. 1A–1D) to produce coarse position information data, and the phase relationships of the radio frequency signals from the transmitting stations are utilized to produce fine position information.

Figure 3:
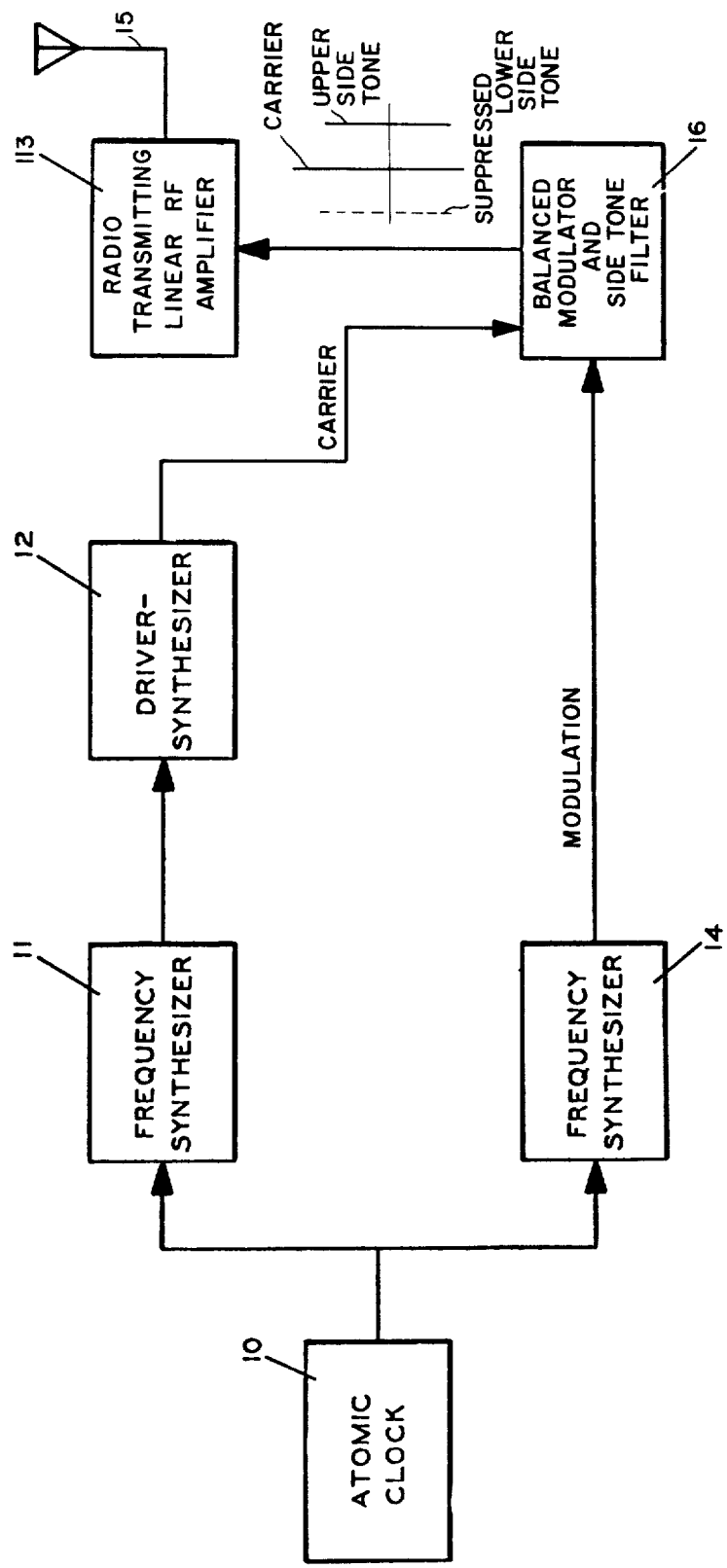
FIG. 3 is a block diagram of an illustrative embodiment of a transmitting station which produces a single side tone signal according to the invention.

In FIG. 3 a further transmitting station, which may be used in place of the transmitting station shown in FIG. 2, also includes an atomic clock 10, frequency synthesizers 11, 12 and 14, a modulator 16, constructed as an amplitude modulator which is preferably a balanced modulator with a side tone filter, and an antenna 15. A single side band radio transmitting linear r.f. amplifier 113 is provided in place of the radio transmitter 13 (FIG. 2); differing from the transmitter 13 in that one of its possible side bands, preferably its upper side band, is eliminated. The modulator 16 receives its carrier signal input from the driver synthesizer 12 and its modulating signal from the frequency synthesizer 14.

Figure 4:
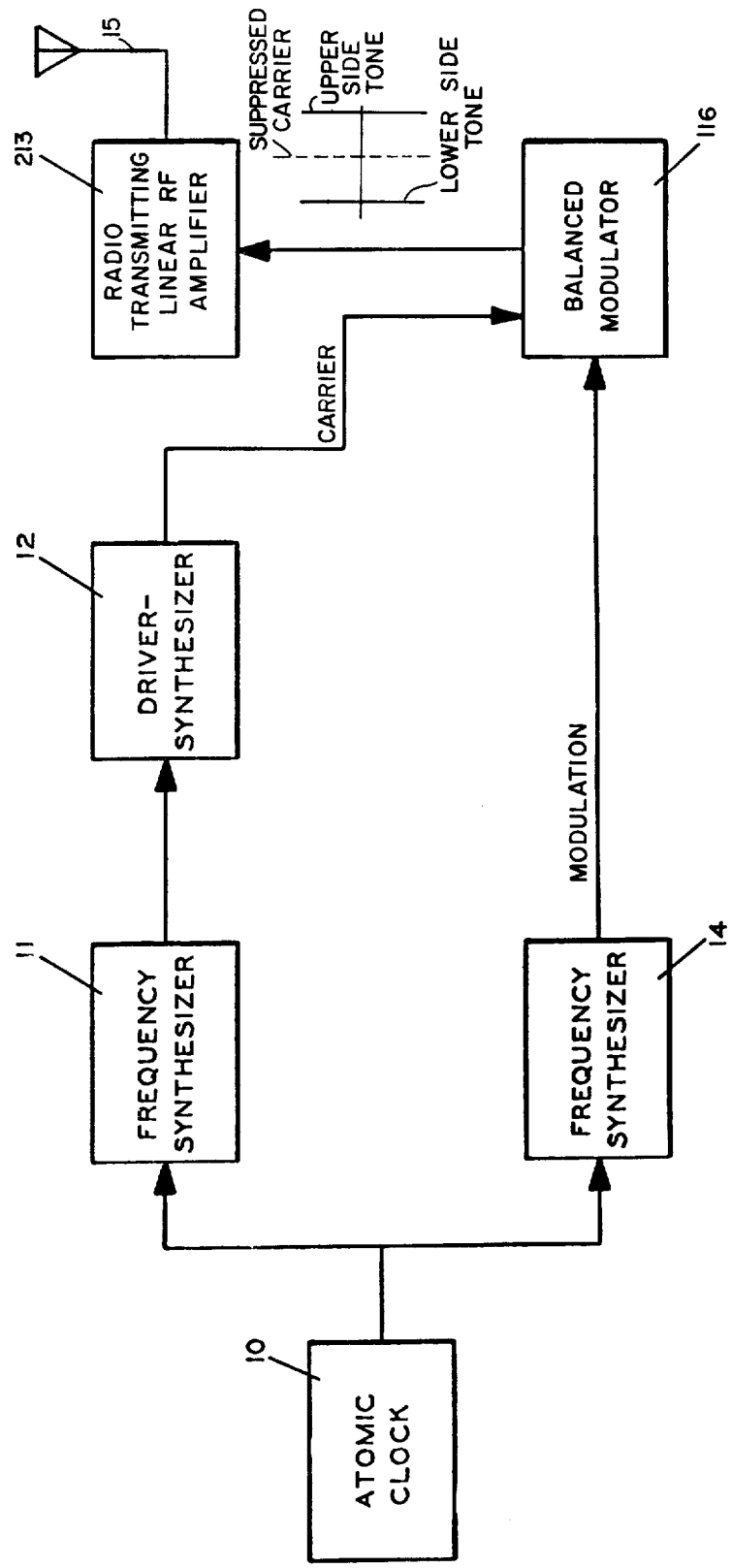
FIG. 4 is a block diagram of a preferred embodiment of a transmitting station which produces a carrier suppressed double side tone signal according to the invention.

In FIG. 4 a preferred transmitting station, which may be used in place of the transmitting station shown in FIG. 2, also includes an atomic clock 10, frequency synthesizers 11, 12 and 14, and an antenna 15. A balanced modulator 116, which receives its carrier signal input from the driver synthesizer 12, is used instead of the modulator 16 (FIG. 2) and a radio transmitting linear r.f. amplifier 213, fed from the modulator 116 supplies a double side band suppressed carrier signal to the antenna 15. The linear r.f. amplifier 213 is used in place of the radio transmitter 13 (FIG. 2). The single side band functions are performed by the balanced modulator and sidetone filter.

It is to be appreciated that the transmitting station illustrated in FIG. 3 has the distinct advantage of extremely low transmission bandwidth requirements. It is also to be appreciated that the single side tones transmitted from the transmitting station illustrated in FIG. 4 contain considerably more power than those produced and transmitted with an unsuppressed carrier. Since all necessary information is present in the upper and lower side tones for producing coarse and fine range data at a receiving station, improved signal-to-noise characteristics are realized for the locating system.

It is not necessary to modulate the radio transmitters continuously for it is seldom necessary to determine the coarse position of a receiving station on a continuous basis, the most recent lane identification as displayed being accurate. It is desirable, however, to provide a carrier signal which is as strong as possible to determine the fine position within a lane. The preferred embodiment of a transmitting station illustrated in FIG. 5 is constructed to provide for burst modulation, thereby allowing an unmodulated radio frequency carrier to be radiated at full power during given periods having, for example, nine second durations, the modulation signal being supplied in bursts having, for example, three second durations.

Figure 5:
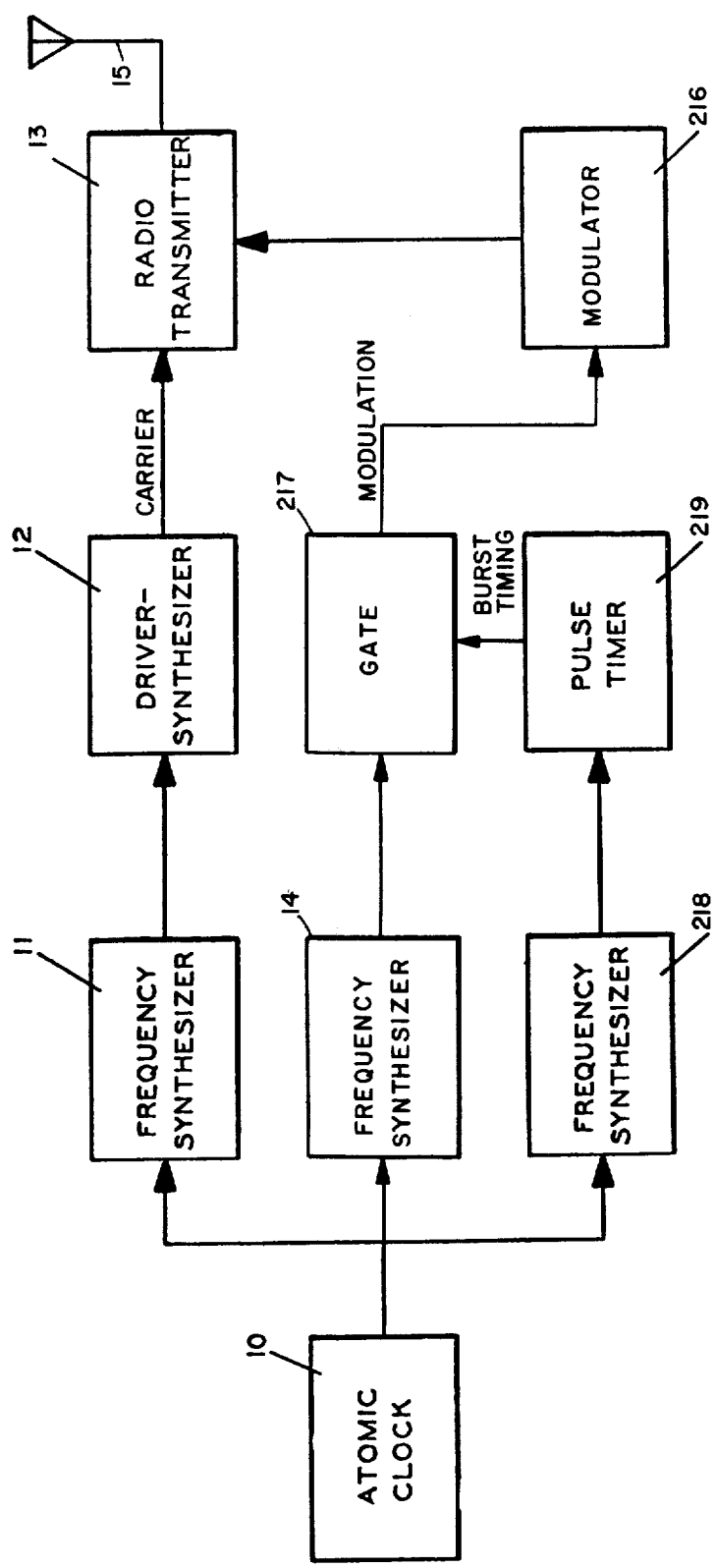
FIG. 5 is a block diagram of a preferred transmitting station which produces a burst modulated carrier according to the invention.

As illustrated in FIG. 5, the transmitting station includes an atomic clock 10 which provides a high frequency signal, for example 9 $GH_2$, which is fed to frequency synthesizers 11, 14 and 218.

The high frequency signal is reduced in the frequency synthesizer 11 to a selected frequency in a range suitable for transmission over distances up to about 100 miles, in an exemplary system, and for accuracy of phase determination. The range may be from about 1.0 to about 5.0 $MH_z$. The output of the frequency synthesizer 11 which is extremely accurate in its phase and frequency characteristics is fed to a driver synthesizer 12 where it is amplified to a level sufficient to drive a highly stable radio transmitter 13 provided with an antenna 15.

The high frequency signal from the clock 10 fed to the frequency synthesizer 14 is converted into a given low frequency signal which is to be used as a single frequency modulation signal. The modulating signal may have a frequency, for example, of 500 $H_z$. The output from the frequency synthesizer 14 is fed to a modulator 216 via a gate circuit 217. The modulator 216 may be an amplitude modulator, a phase modulator or a frequency modulator, as shown in FIG. 2. The modulator 216 may be a balanced modulator corresponding to the balanced modulator 116 shown in FIG. 4. In this case the transmitter 13 would be a transmitting linear r.f. amplifier which receives a double side band suppressed carrier signal from the modulator 216, arranged as illustrated in FIG. 4. The radio transmitter 13 could, if desired, be a linear r.f. amplifier which receives a single side band signal from a balanced modulator and side tone filter, arranged as shown in FIG. 3.

The high frequency signal from the clock 10 fed to the synthesizer 218 is reduced to a low frequency signal which controls and synchronizes a pulse timer 219 which produces, for example, a pulse of 3 seconds duration every 12 seconds. The train of pulses from the pulse timer 219 is fed as an enabling pulse to the gate circuit 217.

Thus, the transmitter 13 produces a burst modulated radio signal which is radiated from the antenna 15, the modulation being present during three second intervals separated by nine second intervals during which the carrier is present at full strength.

Figure 6:
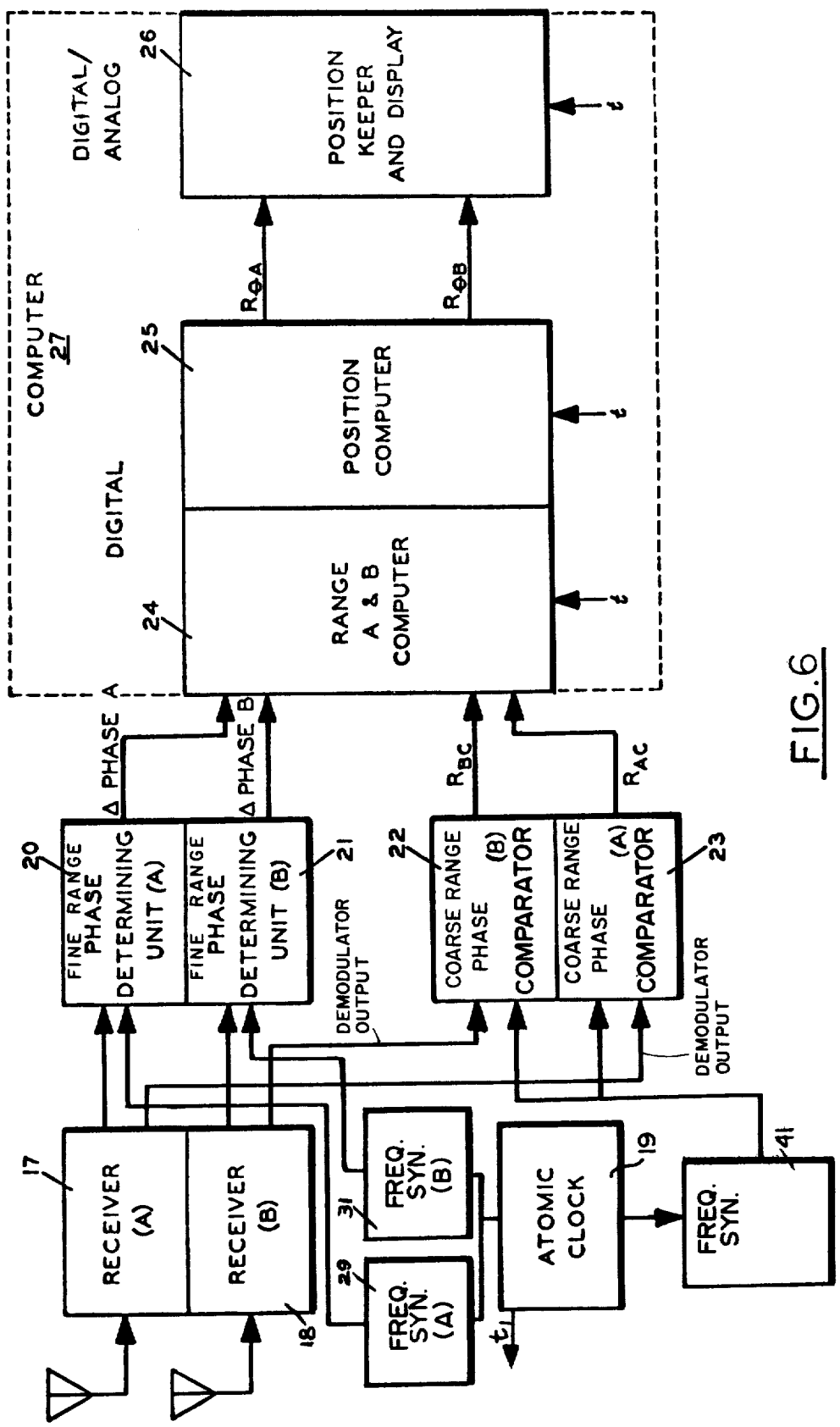
FIG. 6 is a block diagram of an illustrative embodiment of a receiving station according to the invention.

The signal from the radio transmitter 13 (FIG. 2 or 5) or 113 (FIG. 3) or 213 (FIG. 4) at station A (FIG. 1A) is received by the receiver 17 (FIG. 6) while the signal from a corresponding radio transmitter at station B (FIG. 1A) is received by the receiver 18 (FIG. 6). Radio frequency output signals from receivers 17 and 18 are fed to phase determining units 20 and 21, respectively, each of which compares the phase of respective radio frequency signals with the phase of the radio frequency signals from frequency synthesizers 29 and 31 which have their respective inputs coupled to an atomic clock 19. The phase differences translated into digital signals $\Delta$ phase A and $\Delta$ phase B representative of phase differences are fed into a range computer 24 of the computer 27 of the system and converted into two range signals indicating fine position information within a particular lane which may be, for example, 720 feet wide. Each degree of relative phase rotation in the example represents 2 feet. Of course, the outputs of the phase determining units 20 and 21 do not provide lane identification.

Each of the receivers 17 and 18 is provided with appropriate demodulators (not shown) which may be amplitude demodulators, phase demodulators or frequency demodulators depending on the nature of the modulation type selected for use at the transmitting stations. In the event single side tone/carrier signals are received, it is most practical to use balanced demodulators. In the case double side tone/carrier suppressed signals are received, the demodulators must be balanced demodulators. Outputs from the demodulators are fed to phase comparators 23 and 22, respectively. The phase comparators 22 and 23 compare the phase of respective demodulated signals from the receivers 17 and 18 with that of a signal from a frequency synthesizer 41 which has its input coupled to the atomic clock 19. The phase comparators 22 and 23 provide output coarse range digital signals $R_{BC}$ and $R_{AC}$ which are also fed into the range computer 24, the output of which is coupled to a position computer 25 which provides output signals $R_A$ and $R_B$ representing the accurate distance station C is from each of the stations A and B, as illustrated in FIG. 1A.

In the case phase modulation is used, it is to be understood that phase determining units 20 and 21 could advisably be constructed so as to reject from their outputs any signals having a time variation above about 50 cycles; that is, about 1/10 of the modulation frequency. This could be accomplished by a digital filter.

The position computer 25 operates a position keeper and display 26 which converts the two ranges from the shore stations A and B into precision position in any selected coordinate system. Signals $R_A$ and $R_B$ may be either digital or analog signals and the position keeper and display 26 may be either digital or analog or both. The atomic clock 19 is provided with a timing output signal $t_1$ which is used to synchronize the computer 27 as illustrated generally by timing inputs t which are provided by count-down circuits (not shown) which are driven by the timing signal $t_1$. Alternatively, the timing signal $t_1$ could be directly fed into the computer 27 provided that the computer 27 contained suitable count-down circuits.

It is to be appreciated that in the event the receiving station shown in FIG. 6 is used in conjunction with transmitting stations of the type shown in any one of FIGS. 2–5, the phase determining units 20 and 21 are responsive to the carrier or side tone frequencies received by the receivers 17 and 18 and the phase comparators 22 and 23 respond to the actual modulation signals, for example 500 $H_z$, or 1000 $H_z$ in the carrier suppressed case, recovered from the signals received by the receivers 17 and 18.

In the event the receiving station shown in FIG. 6 is used in conjunction with transmitting stations of the type shown in FIG. 4, the phase determining units 20 and 21 are responsive to either the upper or lower side tone signals, preferably the lower side tone signal, and the frequency synthesizers 29, 31 are designed to produce signals having the same frequencies of the particular side tone signals selected. In this case the frequency synthesizer 41 is operatively arranged and designed to produce a reference signal which has a frequency twice as high as the frequency produced in the frequency synthesizer 14 (FIG. 4) as the modulating signal at the transmitters. Thus, the signal produced by the frequency synthesizer 41 would be 1000 $H_z$ in the event the signal produced by the synthesizer 14 (FIG. 4) at each transmitting station were 500 $H_z$, as suggested above.

Figure 7:
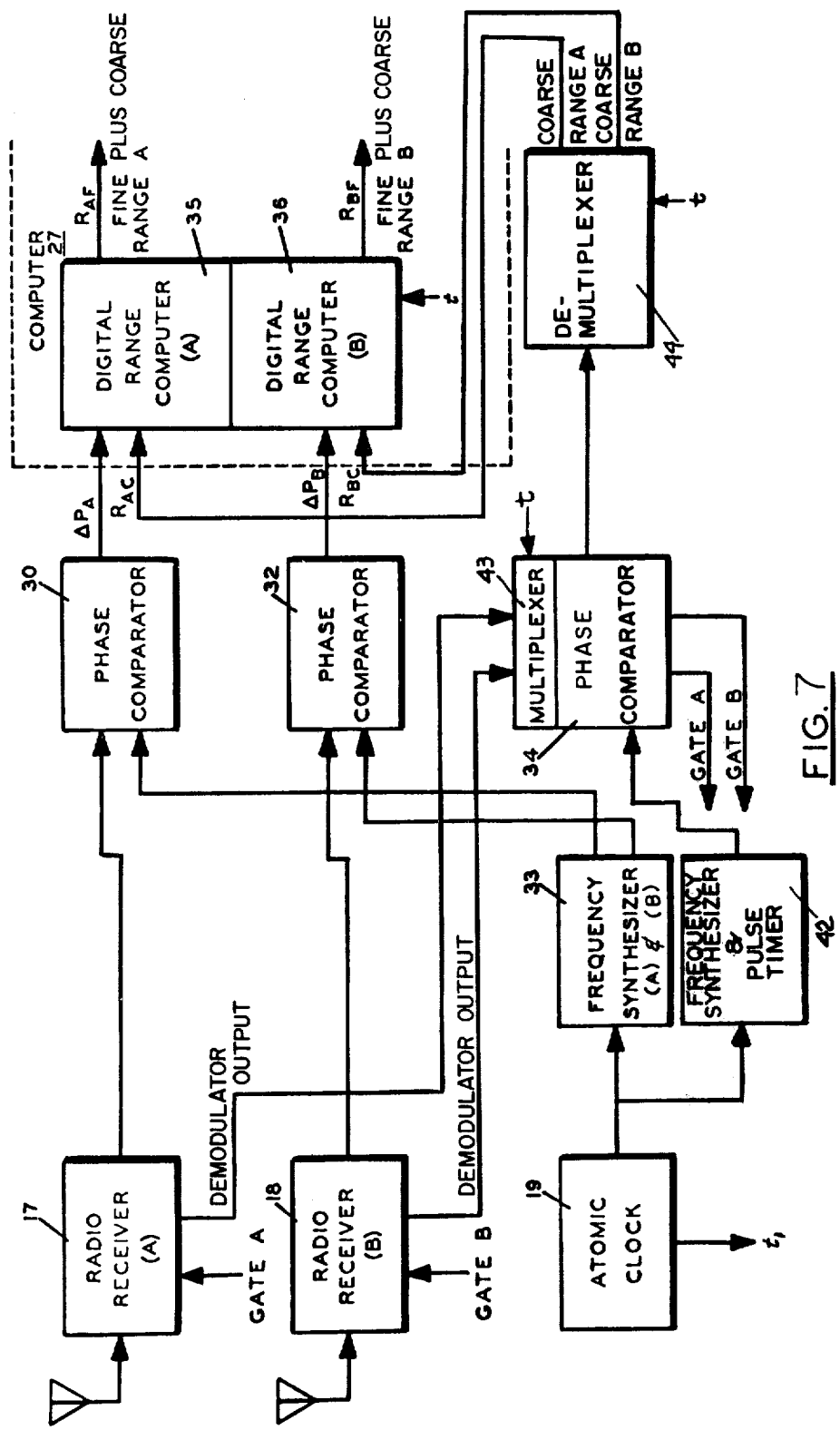
FIG. 7 is a block diagram in greater detail of part of a typical receiving station, the two sheets of the drawing containing FIG. 7 are to be placed end-to-end to illustrate a complete station including a computer.
Figure 7:
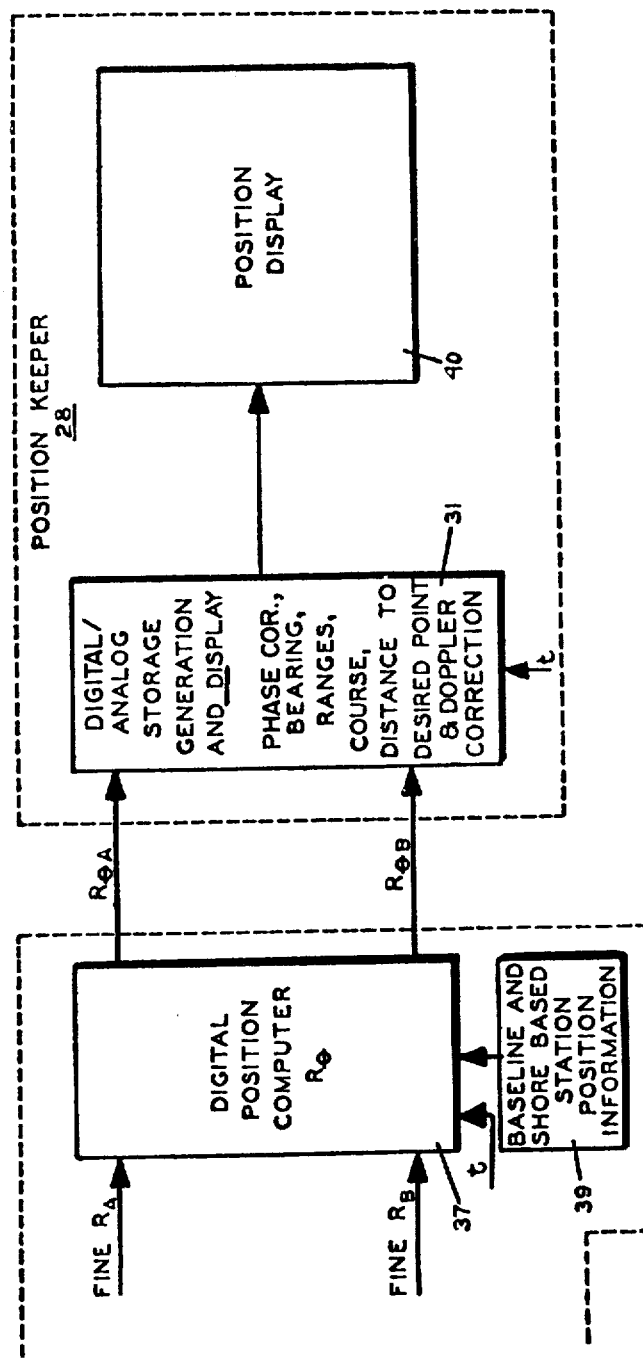

FIG. 7 illustrates in greater detail the instrumentation used in the offshore station when the system is being used to locate an offshore position.

The phase determining unit 20 of FIG. 6 is shown, in FIG. 7, as comprised of a phase comparator 30. The phase determining unit 21 of FIG. 6 is shown in FIG. 7 as comprised of a phase comparator 32.

Frequency synthesizers 33 shown in FIG. 7 correspond to the frequency synthesizers 29 and 31 shown in FIG. 6 and the frequency synthesizer 42 corresponds to the frequency synthesizer 41 shown in FIG. 6.

In the embodiment illustrated in FIG. 7, the function of the two phase comparators 22 and 23, illustrated in FIG. 6, is performed by a single phase comparator 34 which has its inputs, from the receivers 17 and 18, provided via a multiplexer 43, and its outputs representative of coarse ranges A and B fed to the computer 27 via de-multiplexer 44.

Digital outputs from phase comparators 30 and 32 are fed respectively to digital range computers 35 and 36 as fine position data, while outputs from phase comparator 34 are fed respectively to the digital range computers 35 and 36 as coarse position data, via the de-multiplexer 44.

The two digital range computers 35 and 36 process their respective data inputs to provide output signals representing the accurate (fine plus coarse) range of station C from stations A and B respectively.

The outputs from the digital range computers 35 and 36 are fed to a digital position computer 37 associated with a data storage apparatus 39 which provides baseline and shore base station information. Using store information from the storage apparatus 39, the digital position computer 37 translates the accurate position data supplied from the range computers 35 and 36 into position signals $R_A$ and $R_B$ which are fed to a digital-/analog storage generation and display device 31, the output of which is fed to a position display 40.

The device 31 is provided with storage means which contains phase correction data reflecting the initial absolute phase differences, if any, between three atomic clocks. Additional stored information, as desired, may be provided or developed within the device 31 such as bearing, range, course, and known distance to the desired position within an offshore lease, for example, as shown in FIG. 1A. In some applications, such as a fast moving station C, Doppler correction data could be developed or stored within the device 31. In the embodiment illustrated in FIG. 7, the atomic clock 19 provides a timing output signal $t_1$ which is used to develop, in circuitry not illustrated, timing signals generally designated t which synchronize the computer 27, the position keeper 28, the multiplexer 43 and the de-multiplexer 44. The phase comparator 34 is provided with two gating outputs A and B which are used to gate the radio receivers 17 and 18.

While the foregoing discussion is concerned principally with description of the method and system of the invention and its operation in a two-dimensional arrangement, it will be clear that the invention may be applied equally well in three-dimensional arrangements. It is suitable, for example, for locating the position of an aircraft or other object which moves in three dimensions. FIGS. 1B, 1C and 1D show three exemplary three-dimensional arrangements.

Referring to FIG. 1B, a three-dimensional system according to the method and system may include a transmitting station A, a transmitting station B and a transmitting station D each placed at a known position and spaced from one another. A receiving station C, carried by an aircraft, is at an unknown position and becomes the measured or located position in three dimensions. The three transmitting stations A, B and D (FIG. 1B) may be constructed as the transmitting station illustrated in FIG. 2 or the one illustrated in FIG. 3 or the one illustrated in FIG. 4, or the one illustrated in FIG. 5, the only essential difference among the transmitting stations A, B and D being that different RF frequencies are transmitted from respective transmitting stations. As illustrated in FIG. 1B, the receiving station C is carried by an aircraft. The receiving station C (FIG. 1B) may be constructed similarly, for example, to either the receiving station shown in FIG. 6 or the receiving station shown in FIG. 7, it being understood, in either case, that an additional radio receiver suitable for receiving signals from the transmitting station D would be provided at receiving station C as well as instrumentalities for developing $\Delta$ phase D and $R_{DC}$ signals which would be fed to the computer 27 in addition to the $\Delta$ phase A, $\Delta$ phase B, $R_{AC}$ and $R_{BC}$ signals. The frequency synthesizer 41 (FIG. 6) or 42 (FIG. 7) would, of course, produce a local signal having the same frequency as produced by the frequency synthesizer 14 (FIGS. 2, 3 and 5) or twice the frequency of the frequency synthesizer 14 (FIG. 4).

In FIG. 1C, a three-dimensional system for locating the position according to the invention may include a transmitting station A, which is placed at a known position, a transmitting station B, which is placed at a known position, with stations A and B being on a known baseline $R_{base}$, and a receiving station C, illustrated as being carried by an aircraft which is at an unknown position and becomes the located or measured position. In the arrangement shown in FIG. 1C, the two transmitting stations A and B may be constructed as the transmitting station illustrated in FIG. 2 or in FIG. 3 or in FIG. 4 or in FIG. 5, and the receiving station C may be constructed, for example, similarly to either the receiving station shown in FIG. 6 or the receiving station shown in FIG. 7. In the system illustrated in FIG. 1C, however, the receiving station C, which is carried by the aircraft, includes an altimeter (not shown) of known construction which develops height data which is fed to the computer 27 (FIGS. 6 and 7) thereby enabling the computer 27 to determine the position of station C in three dimensions, the computer 27 being capable of determining distances $R_A$ and $R_B$ in accordance with the system as shown in FIG. 1A.

Turning now to FIG. 1D, a three-dimensional system similar to that shown in FIG. 1B is shown, the only essential difference being that transmitting station D is carried by a satellite. The satellite may be either a synchronous satellite or a non-synchronous satellite. If the satellite is synchronous, its position is fixed relative to transmitting stations A and B (FIG. 1D) and the system operates identically to the system shown in FIG. 1B. If the satellite is non-synchronous, its position is constantly changing relative to the positions of transmitting stations A and B (FIG. 1D) in a predetermined pattern. In the latter case, the computer 27 (FIGS. 6 and 7) is provided with a data store which supplies a signal indicative of the instantaneous position of the non-synchronous satellite at any given time. Thus, the computer 27 (FIGS. 6 and 7) may determine from signals representative of $\Delta$ phase A, $\Delta$ phase B, $\Delta$ phase D, $R_{AC}$, $R_{BC}$, $R_{DC}$, as in FIG. 1B, and the signal representing the instantaneous position of the non-synchronous satellite, the position of the receiving station C.

The foregoing description, particularly as it relates to the receiving stations illustrated in FIGS. 6 and 7, as thus far described by way of examples involves the use as tuned radio frequency receivers at the receiving stations. The noise rejection characteristics of the receivers can be considerably improved by use of superheterodyne receivers, particularly superheterodyne receivers which involve double conversion. Since the stages in the receivers desirably have low gains and broad bandwidths i.e. 2–3 KH$_z$, in order to avoid injecting any unwanted phase shifts, it is desirable to use superheterodyne receivers which tend to reject noise signals while maintaining the phase relationships of the signals sought to be amplified. Such a superheterodyne receiver, which may be used as the receiver 17 (FIGS. 6 and 7), for example, and similarly for other receivers to be used at a receiving station location, is illustrated in FIG. 8.

Figure 8:
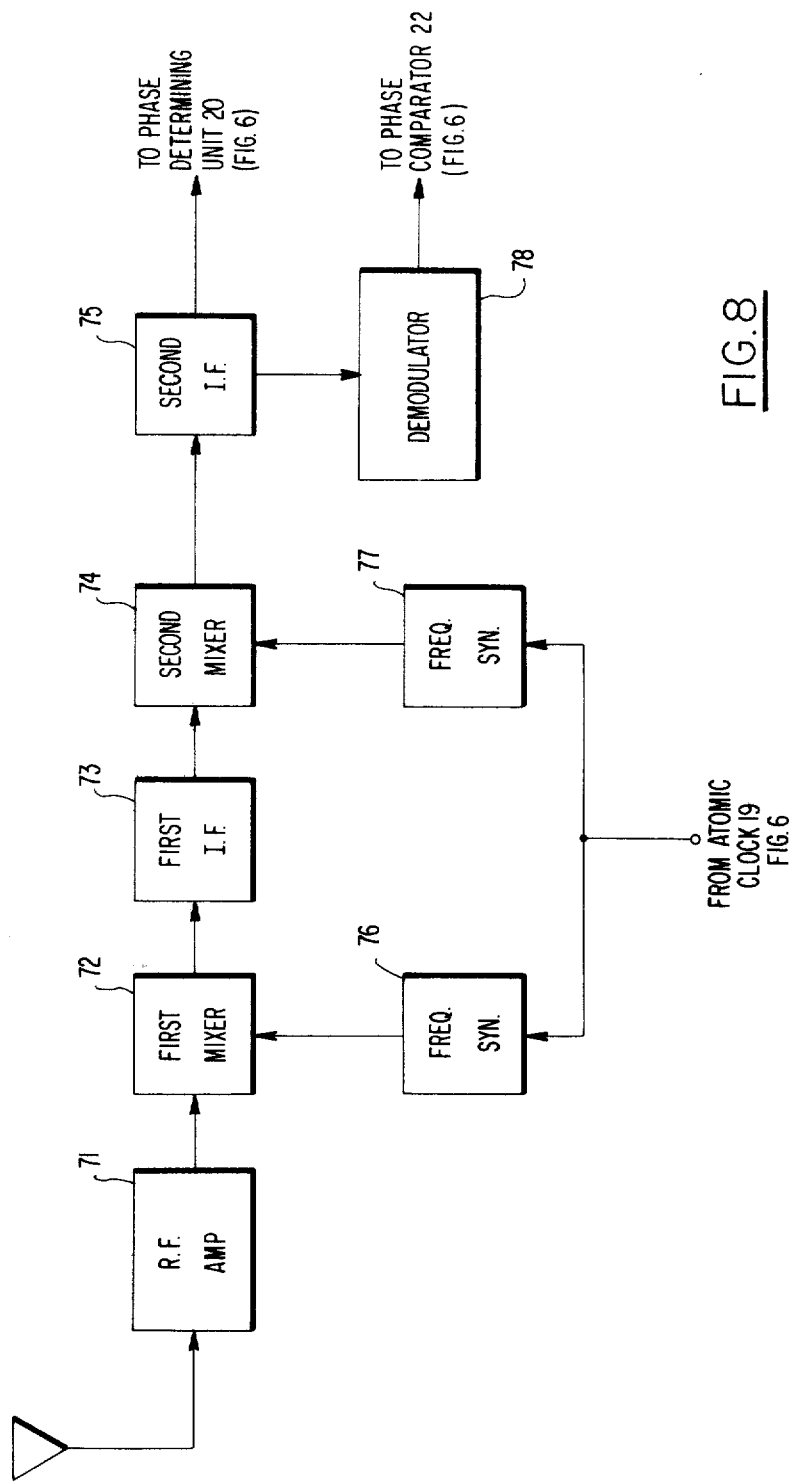
FIG. 8 is a block diagram of part of a receiver which may be used in a receiving station according to the invention, the receiver being a superheterodyne receiver.

As shown in FIG. 8, each of the receivers 17 and 18 at a receiving station includes, in cascade, an R.F. amplifier 71, a first mixer 72, a first I.F. strip 73, a second mixer 74 and a second I.F. strip 75. The receiver includes a frequency synthesizer 76 and a frequency synthesizer 77 which are provided with respective inputs from the atomic clock 19 (FIG. 6), the frequency synthesizers producing signals of appropriate frequencies for local oscillators suitable for supplying the locally generated signals to the mixers 72 and 74.

The I.F. strips 73 and 75 are carefully designed not to distort the signals which are amplified therein, so far as the phase information present on the I.F. signals is concerned, that is, the strips operate on phase locked amplifiers by virtue of their associated local oscillators, which are fed from synthesizers connected to the atomic clock. Since the mixers 72 and 74 are provided with inputs controlled by the atomic clock 19 (FIG. 6), the phase information in the signals passed through the receiver and the modulation information is not distorted or destroyed.

The I.F. output signal from the second I.F. amplifier is fed to a demodulator 78 which, in turn, feeds one input of the phase comparator 23 (FIG. 6) which receives a corresponding signal from the frequency synthesizer 41.

The I.F. output from the second I.F. amplifier is also fed to one input of the phase determining unit 20 (FIG. 6), the other input being supplied from the frequency synthesizer 29 (FIG. 6). The frequency synthesizer 29 supplies a signal having the same frequency as the I.F. signal, in the event the receiving station receives a double side band unsuppressed carrier signal or a single band unsuppressed carrier signal. In the case the receiving station receives a double side tone suppressed carrier signal, the frequency supplied to the phase determining unit 20 (FIG. 6) from the atomic clock 19 (FIG. 6) would correspond to the I.F. signal plus or minus the modulation frequency supplied at the transmitting station. Thus, the phase of one of the side tones is used to determine the coarse position rather than the phase of the carrier. Preferably, the lower side tone is used.

Although the present invention has been illustrated as involving a moving receiving station and two or three transmitting stations, it is to be appreciated that the receiving station could be fixed and one of the transmitting stations moving. In some special applications all of the stations could be moving.

While the present invention has been illustrated, in general, as one in which the signal outputs from phase comparators are digital, the outputs from these units could, if desired, be made analog in which case the analog outputs could be combined in a network, servo system, or the like. For the sake of accuracy, however, the outputs from the phase comparators are desirably digital.

The present invention is highly accurate and serves to eliminate lane ambiguity without the need to be operating at all times or accumulating lanes as, for example, when a vessel carrying the receiving station leaves shore and proceeds to sea.

The atomic clocks used in the present invention may be provided by cesium beam tubes such as the tube forming part of a Hewlett-Packard cesium beam frequency standard sold under model number 5061A. The transmitters and receivers may be of various constructions, and should be extremely stable. The computer used may be, for example, a Control Data Corporation 5103A system or a Control Data Corporation 469 system, the latter being particularly suitable for use in aircraft.

It will be appreciated that many variations of the present invention are possible, and the foregoing detailed description relates only to illustrative embodiments. It is to be understood that various changes may be made by those skilled in the art within the principle and scope of the invention as expressed in the appended claims.

I claim:

1. A position locating system comprising, in combination:
   a. a first frequency standard source of a signal of given frequency and given phase;
   b. a second frequency standard source of a signal of said given frequency and a predetermined phase relationship with said given phase;
   c. a third frequency standard source of a signal of said given frequency and a predetermined phase relationship with said given phase;
   d. means controlled by said first source for transmitting a first radio signal from a first point including first modulating means controlled by said first source for modulating said first radio signal with at least one first, single frequency signal;
   e. means controlled by said second source for transmitting a second radio signal from a second point including second modulating means controlled by said second source for modulating said second radio signal with at least one second, single frequency signal;
   f. means controlled by said third source for generating a signal having a frequency related to that of said first radio signal and a signal having a frequency related to that of said second radio signal at a third point;
   g. means controlled by said third source for producing respective at least one first reference signal and at least one second reference signal having respective frequencies related to those of said at least one first, single frequency signal and to said at least one second, single frequency signal;
   h. means for receiving said first radio signal and said second radio signal at said third point which develop therefrom respective signals respectively identical in frequency to those signals produced at said third point related respectively to said first radio signal and to said second radio frequency signal;
   i. first phase comparing means at said third point for comparing the phase of the signal developed which relates to said first radio signal with that of said signal generated at said third point having a frequency identical thereto;
   j. second phase comparing means at said third point for comparing the phase of the signal developed which relates to said second radio signal with that of said signal generated at said third point having a frequency identical thereto;
   k. means at said third point for demodulating signals to recover respectively signals corresponding to said at least one first, single frequency signal and said at least one second, single frequency signal and having respective frequencies identical to those of said at least one first reference signal and said at least one second reference signal;
   l. and means for comparing respectively the phase of the recovered signals corresponding to said at least one first, single frequency signal and said at least one second, single frequency signal with the respective phases of said at least one first and said at least one second reference signals.

2. A position locating system according to claim 1 wherein said first frequency standard source, said second frequency standard source and said third frequency standard source are respectively first, second and third atomic clocks.

3. A position locating system as claimed in claim 1 including computer means receiving output signals from said first phase comparing means, from said second phase comparing means and from said means for comparing respectively the phase of the recovered signal corresponding to said first single frequency signal and the recovered signal corresponding to said second single frequency signal with the respective phase of said first and second reference signals for providing output signal data representative of the distance the third point is from the first and second points.

4. A position locating system as claimed in claim 3 including means controlled by said computer means for storing and displaying said output signal data.

5. A position locating system according to claim 1 wherein said first modulating means is a first amplitude modulating means for amplitude modulating said first radio signal with said first single frequency signal, said second modulating means is a second amplitude modulating means for amplitude modulating said second radio signal with said second single frequency signal, and said means at said third point for demodulating are means for detecting amplitude modulation to recover signals corresponding to said first single frequency signal and said second single frequency signal.

6. A position locating system according to claim 1 wherein said first modulating means is a first frequency modulating means for frequency modulating said first radio signal with said first single frequency signal, said second modulating means is a second frequency modulating means for frequency modulating said second radio signal with said second single frequency signal, and said means at said third point for demodulating are frequency demodulating means for detecting frequency modulation to recover signals corresponding to said first single frequency signal and said second single frequency signal.

7. A position locating system according to claim 1 wherein said first modulating means is a first phase modulating means for phase modulating said first radio signal with said first single frequency signal, said second modulating means is a second phase modulating means for phase modulating said second radio signal with said second single frequency signal, and said means at said third point for demodulating are means for detecting phase modulations to recover signals corresponding to said first single frequency signal and said second single frequency signal.

8. A position locating system according to claim 1 comprising a fourth frequency standard source of signal of said given frequency and a predetermined phase relationship with said given phase, means controlled by said fourth source for transmitting a third radio signal from a fourth point including third modulating means controlled by said fourth source for modulating said third radio signal with a third single frequency signal, means for receiving said third radio signal at said third point, means controlled by said third source for generating a third reference signal having a frequency related to that of said third single frequency signal, means controlled by said third source for generating a signal having a frequency related to that of said third radio signal, means for receiving the third radio signal at said third point which develops a signal identical in frequency to that of the signal generated at said third point related to the third radio signal, third phase comparing means at said third point for comparing the phase of the signal developed which relates to said third radio signal with that of said signal generated at said third point having a frequency identical thereto, means at said third point for demodulating to recover a signal corresponding to said third single frequency signal and having a frequency identical to that of said third reference signal, and means for comparing the phase of said signal corresponding to said third single frequency signal with the phase of said third reference signal.

9. A position locating system according to claim 8 wherein said third modulating means is a third modulating means for amplitude modulating said third radio signal with said third single frequency signal, said means at said third point for demodulating to recover said signal corresponding to said third single frequency signal is a means for detecting amplitude modulation, said first modulating means is a first modulating means for amplitude modulating said first radio signal with said first single frequency signal, and said second modulating means is a second modulating means for amplitude modulating said second radio signal with said second single frequency signal, and said means at said third point for demodulating to recover signals corresponding to said first single frequency signal and said second single frequency signal are means for detecting amplitude modulation.

10. A position locating system according to claim 8 wherein said third modulating means is a third modulating means for frequency modulating said third radio signal with said third single frequency signal, said means at said third point for demodulating to recover a signal corresponding to said third single frequency signal is a means for detecting frequency modulation, said first modulating means is a first frequency modulating means for frequency modulating said first radio signal with said first single frequency signal, said second modulating means is a second modulating means for frequency modulating said second radio signal with said second single frequency signal, and said means at said third point for demodulating to recover signals corresponding to said first single frequency signal and said second single frequency signal are means for detecting frequency modulation.

11. A position locating system according to claim 8 wherein said third modulating means is a third modulating means for phase modulating said third radio signal with said third single frequency signal, said means at said third point for demodulating to recover a signal corresponding to said third single frequency signal is a means for detecting phase modulation, said first modulating means is a first modulating means for phase modulating said first radio signal with said first single frequency signal, said second modulating means is a second modulating means for phase modulating said second radio signal with said second single frequency signal, and said means at said third point for demodulating to recover signals corresponding to said first single frequency signal and said second single frequency signal are means for detecting phase modulation.

12. A position locating system according to claim 8 including computer means receiving output signals from (1) said first phase comparing means, (2) from said second phase comparing means, (3) from said third phase comparing means, (4) from said means for comparing respectively the phase of the recovered signal corresponding to said first single frequency signal and the recovered signal corresponding to said second single frequency signal with the respective first and second reference signals and (5) from said means for comparing the recovered signal corresponding to said third single frequency signal with said third reference signal for providing output signal data representative of distance said third point is from the first, second and fourth points.

13. A position locating system as claimed in claim 12 including means controlled by said computer means for storing and displaying said output signal data.

14. A position locating method comprising: providing a first frequency standard signal of given frequency and phase; providing a second frequency standard signal of said given frequency and a predetermined phase relationship to said given phase; providing a third frequency standard signal of said given frequency and a predetermined phase relationship to said given phase; modulating a first radio signal related to and controlled by said first standard signal with at least one first, single frequency signal also related to and controlled by said first standard signal; transmitting the first radio signal from a first point; modulating a second radio signal related to and controlled by said second standard signal with at least one second, single frequency signal also related to and controlled by said second standard signal; transmitting the second radio signal from a second point; generating at a third point under control of said third frequency standard signal at least one first, reference signal related in frequency to said at least one first, single frequency signal and at least one second reference signal related in frequency to said at least one second, single frequency signal; generating at said third point, also under control of said third frequency standard signal, a third reference signal and a fourth reference signal respectively related in frequency to said first radio signal and to said second radio signal; recovering at said third point signals corresponding to said at least one first, single frequency signal and said at least one second, single frequency signal and having respective frequencies identical to those of said at least one first reference signal and said at least one second reference signal; comparing the phase of the signal corresponding to said at least one first, single frequency signal recovered at said third point with that of said at least one reference signal; comparing the phase of the signal corresponding to said at least one second, single frequency signal recovered at said third point with that of said at least one second reference signal; developing respectively from said first and said second radio signals received at said third point a first and a second signal identical respectively in frequency to said third reference signal and to said fourth reference signal; comparing the phase of said third reference signal with that of said signal identical in frequency thereto which is developed from said first radio signal at said third point; and comparing the phase of said fourth reference signal with that of said signal identical in frequency thereto which is developed from said second radio signal received at said third point.

15. A position locating method according to claim 14 wherein said first frequency standard signal, said second frequency standard signal and said third frequency signal are provided respectively from first, second and third atomic clocks.

16. A position locating method according to claim 14 wherein the step of modulating said first radio signal is the step of amplitude modulating said first radio signal with said first single frequency signal, the step of modulating said second radio signal is the step of amplitude modulating said second radio signal with said second single frequency signal, and the step of recovering signals corresponding to said first single frequency signal and said second single frequency signal comprises steps of amplitude demodulating.

17. A position locating method according to claim 14 wherein the step of modulating said first radio signal is the step of frequency modulating said first radio signal with said first single frequency signal, the step of modulating said second radio signal is the step of frequency modulating said second radio signal with said second single frequency signal, and the step of recovering signals corresponding to said first single frequency signal and said second single frequency signal comprises frequency demodulating.

18. A position locating method according to claim 14 wherein the step of modulating said first radio signal is the step of phase modulating said first radio signal with said first single frequency signal, the step of modulating said second radio signal is the step of phase modulating said second radio signal with said second single frequency signal, and the step of recovering signals corresponding to said first single frequency signal and said second single frequency signal comprises steps of phase demodulating.

19. The position locating method according to claim 14 including providing a fourth frequency standard signal of the given frequency and a predetermined phase relationship with said given phase, modulating a third radio signal related to and controlled by said fourth standard signal with a third single frequency signal also related to and controlled by said fourth standard signal, transmitting the third radio signal from a fourth point, receiving said third radio signal at said third point, generating at said third point under control of said third standard signal a fifth reference signal having a frequency related to that of said third radio signal, generating at said third point a sixth reference signal having a frequency related to that of said third single frequency signal, recovering at said third point a signal corresponding to said third single frequency signal and having a frequency identical to that of said sixth reference signal, developing from said third radio signal received at said third point a signal identical in frequency to said fifth reference signal, comparing the phase of said fifth reference signal with that of said signal identical in frequency thereto which is developed from said third radio signal received at said third point; and comparing the phase of the recovered signal corresponding to said third single frequency signal with said sixth reference signal.

20. The position locating method according to claim 19 wherein the step of modulating said third radio signal is the step of amplitude modulating said third radio signal with said third single frequency signal, the step of recovering a signal corresponding to said third single frequency signal is a step of amplitude demodulating, the step of modulating said first radio signal is the step of amplitude modulating said first radio signal with said first single frequency signal, the step of modulating said second radio signal is the step of amplitude modulating said second radio signal with said second single frequency signal, and the step of recovering signals corresponding to said first single frequency signal and said second single frequency signal comprises steps of amplitude demodulating.

21. The position locating method according to claim 19 wherein the step of modulating said third radio signal is the step of frequency modulating said third radio signal with said third single frequency signal, the step of recovering a signal corresponding to said third single frequency signal is a step of frequency demodulating, the step of modulating said first radio signal is the step of frequency modulating said first radio signal with said first single frequency signal, the step of modulating said second radio signal is the step of frequency modulating said second radio signal with said second single frequency signal, and the step of recovering signals corresponding to said first single frequency signal and said second single frequency signal comprises steps of frequency demoduating.

22. The position locating method according to claim 19 wherein the step of modulating said third radio signal is the step of phase modulating said third radio signal with said third single frequency signal, and the step of recovering a signal corresponding to said third single frequency signal is a step of phase demodulating, the step of modulating said first radio signal is the step of phase modulating said first radio signal with said first single frequency signal, the step of modulating said second radio signal is the step of phase modulating said second radio signal with said second single frequency signal, and the step of recovering signals corresponding to said first single frequency signal and said second single frequency signal comprises steps of phase demodulating.

23. A position locating system comprising a plurality of frequency standard sources of signals of given frequency and predetermined phase relationships; means controlled respectively by each of said plurality of sources for transmitting from respective points respective radio signals, these means including respective modulating means controlled respectively by respective ones of said plurality of frequency standard sources for modulating each of said respective radio signals with at least one respective single frequency signal derived from respective ones of said frequency standard sources; a further frequency standard source of signal at an additional point having the same given frequency as said plurality of frequency standard sources and a predetermined phase relationship; means controlled by said further frequency standard source of signals for generating at said additional point a first plurality of reference signals related respectively to said respective radio signals; means controlled by said further frequency standard source of signal at said additional point for producing a second plurality of reference signals having respective frequencies related respectively to the frequencies of said single frequency signals; means for receiving said respective radio signals at said additional point; means at said additional point for deriving from said radio signals received at said additional point a further plurality of signals respectively identical in frequency to said first plurality of reference signals; phase comparing means at said additional point for comparing respectively the phase of each signal of said further plurality signals derived from said radio signals with the phase of respective signals of said first plurality of reference signals; means at said additional point for recovering an additional plurality of signals corresponding respectively to respective ones of said single frequency signals and having respective frequencies identical to the frequencies of respective ones of said second plurality of reference signals; and phase comparing means for comparing respectively the phase of each recovered signal of said additional plurality of signals with the phase of respective signals of said second plurality of reference signals.

24. A position locating system according to claim 23 wherein said plurality of frequency standard sources of signals are two sources of signals and the respective points are two points.

25. A position locating system according to claim 23 wherein said plurality of frequency standard sources of signals are three sources of signals and the respective points are three points.

26. A position locating system according to claim 25 wherein at least one of said plurality of frequency standard sources of signals is carried by a satellite.

27. A position locating system according to claim 25 wherein said source of signal at said additional point is carried by an aircraft.

28. A position locating system according to claim 24 wherein said source of signal at said additional point is carried by an aircraft, said aircraft having an altimeter.

29. A position locating system according to claim 23 wherein each modulating means is an amplitude modulating means.

30. A position locating system according to claim 23 wherein each modulating means is a frequency modulating means.

31. A position locating system according to claim 23 wherein each modulating means is a phase modulating means.

32. A position locating system according to claim 23 wherein said means for receiving said radio signals includes superheterodyne receiver means having mixer means controlled by said additional frequency standard source of signal at said additional point for reducing the frequency of the respective radio signals received.

33. A position locating system according to claim 23 wherein said modulator means comprise respective balanced modulators, the respective radio signals being double side tone suppressed carrier signals.

34. A position locating system according to claim 23 wherein said means for transmitting comprise respective single side band transmitter means.

35. A position locating system according to claim 23 wherein said respective modulating means include means for modulating with bursts of respective ones of said single frequency signals.

36. A transmitting station in a position locating system in which both transmitted radio signals and modulation signals carried thereon are utilized to locate accurately a position and have a fixed phase-time relationship to one another, said transmitting station comprising: a radio transmitter; a radiating means coupled to said transmitter; a stable source of oscillations in the form of a frequency standard; means controlled by said source of oscillations for supplying a stable radio frequency signal to said transmitter, which stable radio frequency signal provides in its phase as received at a distant point a basis for developing fine distance datum; and modulating means controlled by said source of oscillations for modulating said transmitter with at least one single frequency signal, which signal provides a basis for developing, at a distant point, coarse distance datum.

37. A radio receiving station comprising a stable source of oscillations, means receiving a plurality of radio frequency signals modulated respectively with at least a respective one of a plurality of single frequency signals, means controlled by said stable source of oscillations for developing a first plurality of reference signals corresponding respectively to said plurality of radio frequency signals, means controlled by said stable source of oscillations for developing a second plurality of reference signals corresponding respectively to said plurality of single frequency signals, means for developing from said plurality of radio signals a further plurality of signals identical in frequency to respective ones of said first plurality of reference signals, first phase comparing means for comparing the phase of each of said further plurality of signals with respective ones of said first plurality of reference signals, means for recovering an additional plurality of signals corresponding respectively to respective ones of said plurality of single frequency signals and having respective frequencies identical to respective ones of said second plurality of reference signals, and second phase comparing means for comparing the phase of each signal of said additional plurality of signals with the phase of respective ones of said second plurality of reference signals.

38. A radio receiving station as claimed in claim 37 wherein said stable source of oscillations comprises an atomic clock.

39. A radio receiving station as claimed in claim 37 wherein said means for receiving said plurality of signals comprises means for receiving two signals.

40. A radio receiving station as claimed in claim 37 wherein said means for receiving said plurality of signals comprises means for receiving three signals.

41. A radio receiving station as claimed in claim 37 wherein said means for recovering an additional plurality of signals comprises amplitude modulation detecting means.

42. A radio receiving station as claimed in claim 37 wherein said means for recovering an additional plurality of signals comprises frequency modulation detecting means.

43. A radio receiving station as claimed in claim 37 wherein said means for recovering an additional plurality of signals comprises phase modulation detecting means.

44. A radio receiving station as claimed in claim 37 including mixer means responsive to signals derived from said source of oscillations and to each of said plurality of radio frequency signals for reducing the frequency of each of said plurality of radio frequency signals to a plurality of signals of lower frequency.

45. A radio receiving station as claimed in claim 39 wherein said receiving station is carried on a vehicle.

46. A radio receiving station as claimed in claim 39 wherein said vehicle is a ship.

47. A radio receiving station as claimed in claim 40 wherein said receiving station is carried on a device movable in three dimensions.

48. A radio receiving station as claimed in claim 47 wherein said device is an aircraft.

49. A receiving station as claimed in claim 37 including a computer means responsive to output signals from said first phase comparing means and from said second phase comparing means for determining the distance the receiving station is from each of a plurality of transmitting stations and the position of the receiving station located.

50. A receiving station as claimed in claim 49 including means responsive to said output signal data from said computer means for storing and displaying said output signal data.

* * * * *